United States Patent [19]

Hsu

[11] Patent Number: 5,762,429
[45] Date of Patent: Jun. 9, 1998

[54] PRINTING HEAD STRUCTURE OF CALCULATOR HAVING BOLD CHARACTERS

[75] Inventor: Chen Shan Hsu, Taipei, Taiwan

[73] Assignee: Kinpo Electronics, Inc., Taipei, Taiwan

[21] Appl. No.: 761,679

[22] Filed: Dec. 6, 1996

[51] Int. Cl.$^6$ ........................................ B41J 1/20
[52] U.S. Cl. ........................ 400/146; 101/93.14; 400/466
[58] Field of Search ............................... 400/146, 174, 400/466; 101/105, 111, 93.13, 93.14, 93.37, 93.38

[56] References Cited

U.S. PATENT DOCUMENTS

| | | | |
|---|---|---|---|
| 3,342,128 | 9/1967 | Weitzner | 101/111 |
| 3,795,186 | 3/1974 | Curtiss et al. | 101/93.14 |
| 3,845,709 | 11/1974 | Gardiner | 101/93.14 |
| 4,218,754 | 8/1980 | Schaeffer | 101/93.14 |
| 4,428,285 | 1/1984 | Cole et al. | 400/146 |
| 4,611,537 | 9/1986 | Hamisch, Jr. | 101/105 |
| 5,007,748 | 4/1991 | Lee et al. | 101/93.13 |
| 5,152,616 | 10/1992 | Kamijo | 400/146 |

*Primary Examiner*—Edgar S. Burr
*Assistant Examiner*—Leslie Grohusky
*Attorney, Agent, or Firm*—Pro-Techtor International Services

[57] ABSTRACT

A printing head structure of calculator, including a belt type printing head the outer periphery of which is disposed with at least one group of fine characters and at least one group of coarse characters. The fine characters have the same symbols and numerals as the coarse ones, while having different thicknesses and letterforms. By means of a printing control program of the calculator, the printing head is able to print out a positive or negative result respectively by fine characters or coarse characters so as to apparently visually distinguish the positive result from the negative one and thus achieve a reliably reminding effect.

2 Claims, 3 Drawing Sheets

PRINTING HEAD STRUCTURE OF CALCULATOR HAVING BOLD CHARACTERS

BACKGROUND OF THE INVENTION

The present invention relates to a printing head structure of calculator, including a belt type printing head the outer periphery of which is disposed with at least one group of fine characters and at least one group of coarse characters having different thicknesses and letterforms. After calculation, the printing head prints out a positive or negative result respectively by fine characters or coarse characters so that a user can apparently visually distinguish the positive result from the negative one.

In a conventional belt type printing head structure, the character/symbol usually are composed of two identical groups of patterns. The Profiles and arrangements of the two groups of patterns (such as 0 to 9, +, −, M+, M−, MU and other specifically used symbols) are all the same and the lines of the patterns have unified thickness. Therefore, after Printing the result of calculation, a user must judge a positive number from a negative one by means of the symbols of "+" and "−". Accordingly, in the case that the symbols of "+" and "−" are abraded vaguely or the user incautiously mis-judges the symbols, a serious error may take place to cause great loss.

In order to avoid the above error, it has been tried by the manufacturers to develop various measures for reminding the user. Preferably, an audio or visual way is employed to achieve the reminding function. Therefore, a calculator with speaking function is commercially available. However, a speech means must be added to the calculation mechanism and printing structure of the calculator. This complicates the structure of the calculator and increases the cost thereof. Also, the ratio of failure of the calculator is increased. Furthermore, the speech means can remind the user only when using the calculator, while lacking the reminding function for those who read the papers after printing. On the other hand, no visual reminding measure of the calculator is available at present time.

SUMMARY OF THE INVENTION

It is a primary object of the present invention to provide a printing head structure of calculator, including a belt type printing head the outer periphery of which is disposed with at least one group of fine characters and at least one group of coarse characters. The fine characters have the same symbols and numerals as the coarse ones, while having different thicknesses and letterforms. By means of a printing control program of the calculator, the printing head is able to print out a positive or negative result respectively by fine characters or coarse characters so as to apparently visually distinguish the positive result from the negative one and thus achieve a reliably reminding effect.

It is a further object of the present invention to provide the above printing head structure in which only the belt type printing head needs to be modified. (Such modification will not lead to increment of manufacturing cost.) While the other parts of the printing head structure remain unchanged.

It is still a further object of the present invention to provide the above printing head structure in which the paper is printed with the fine or coarse characters to create a permanent visual reminding effect instead of the temporary audio reminding effect of a conventional speech means.

The present invention can be best understood through the following description and accompanying drawings, wherein:

DETAILED DESCRIPTION OF PREFERRED EMBODIMENT

Figure 1:
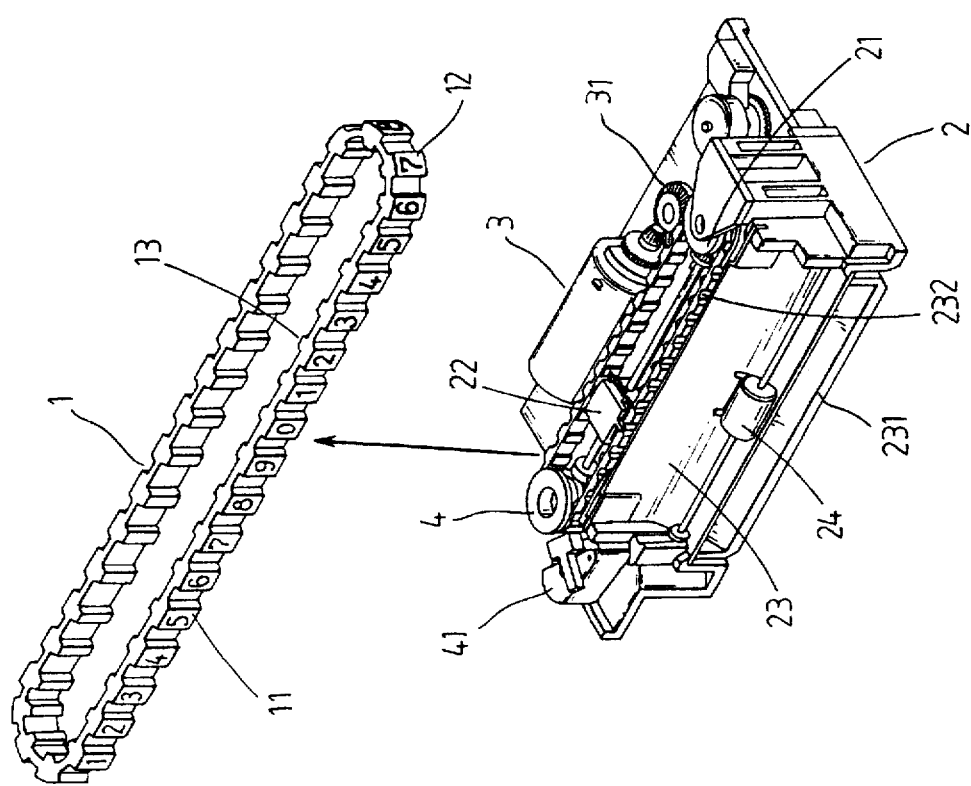
FIG. 1 is a perspective exploded view of the present invention.

Please refer to FIG. 1. The present invention includes a belt type printing head 1 fitted between a belt driving pulley 21 and an ink dipping roller 4 of a printing seat 2. The outer periphery of the printing head 1 is disposed with at least one group of fine characters 11 and at least one group of coarse characters 12. The fine characters 11 have the same symbols and numerals as the coarse ones 12, while having different letterforms (such as different thicknesses, forms, etc.) Each fine character 11 or coarse character 12 is disposed with a projection 13 on back side. One side of the printing seat 2 between the roller 4 and the pulley 21 is disposed with a downward extending arch paper guiding board 23. One side of the paper guiding board 23 is formed with a paper feeding slit 231. A paper guiding roller 24 is disposed above the paper feeding slit 231. The other side of the paper guiding board 23 is disposed with a paper releasing slit 232 between the printing seat 2 and the printing head 1. A pressing head 22 is disposed between the roller 4 and the pulley 21, and slides back and forth along an inner side of the belt type printing head 1. A driving motor 3 is disposed on the printing seat 2 opposite to the paper guiding board 23 and connected to the pulley 21 via a gear set 31 for driving the pulley 21, whereby one side of the belt type printing head I can be slided along the paper releasing slit 232 of the paper guiding board 23. An ink receptacle 41 is disposed adjacent to the ink dipping roller 4, whereby the fine characters 11 or coarse characters 12 of the belt type printing head 1 can slide thereover to be dipped with the ink. The pressing head 22 serves to press the fine or coarse characters 12 at the projections 13 thereof against the paper so as to print the characters thereon.

Figure 2:
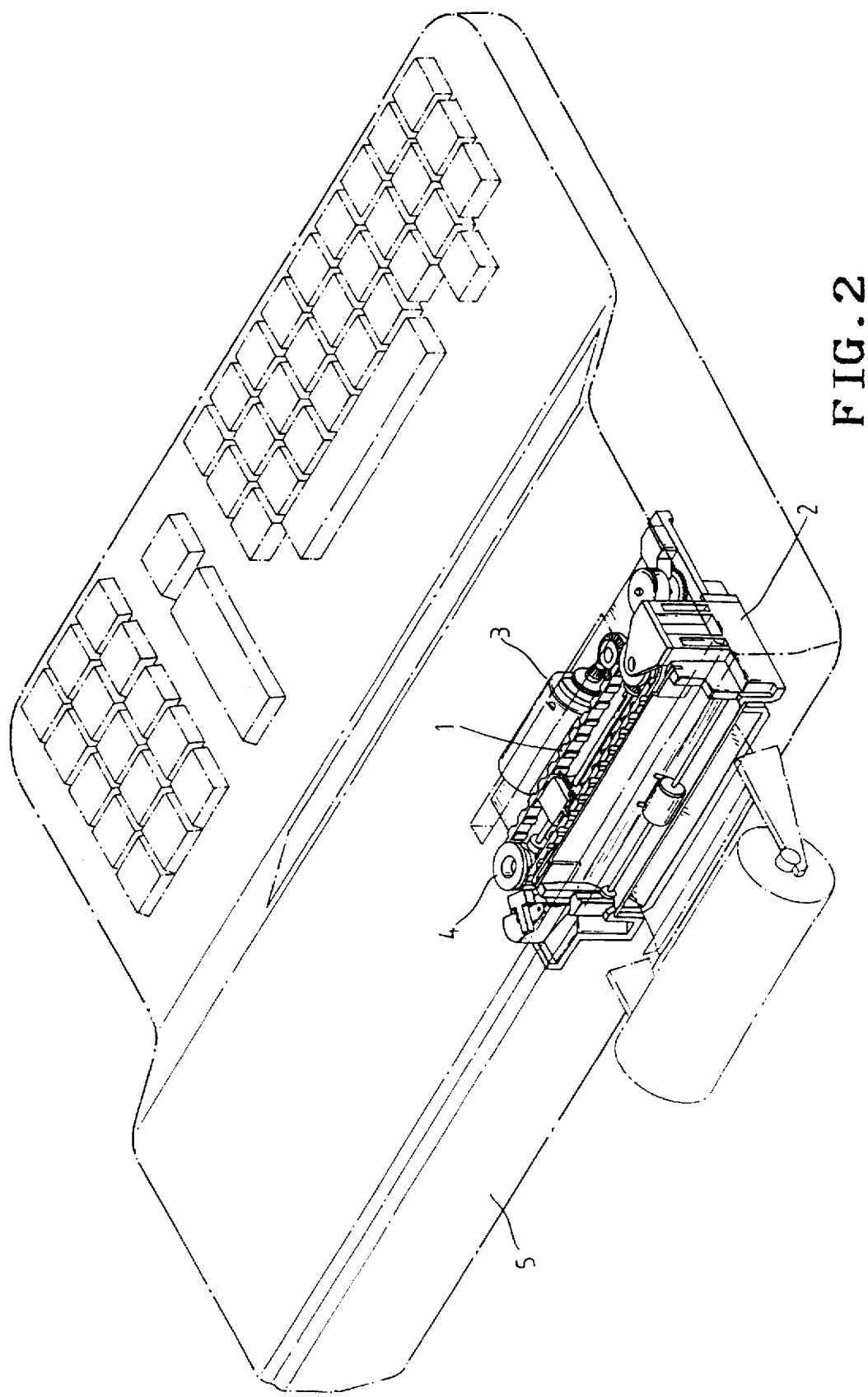
FIG. 2 is a perspective assembled view of the assembly of the present invention and the calculator main body.
Figure 3:
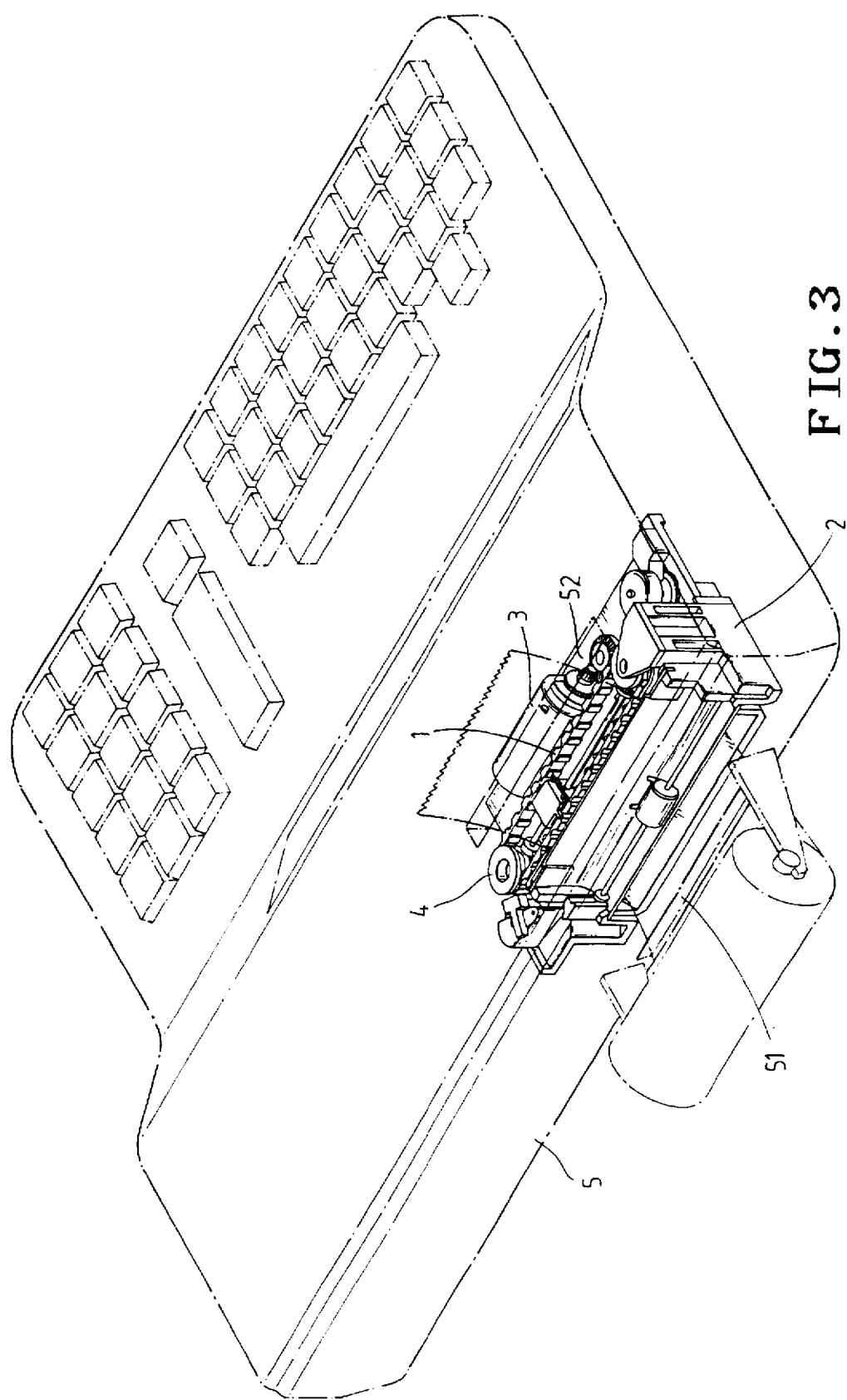
FIG. 3 is a view according to FIG. 2, showing the operation of the present invention.

FIGS. 2 and 3 show the assembly of the present invention and the main body of the calculator. The present invention is installed on a corner of the main body 5. A paper entrance 51 is formed on the main body 5 in alignment with the paper feeding slit 231 and a paper exit 52 is formed on the main body 5 in alignment with the paper releasing slit 232. In use, the paper is fed through the paper entrance 51 into the paper feeding slit 231. The paper guiding roller 24 guides the paper to move upward along the paper guiding board 23 and extend out of the paper releasing slit 232. After the calculator 5 completes the calculation of the input data, a Printing control software judges whether the result is positive or negative and prints out the positive or negative result respectively by fine characters 11 or coarse characters 12. Therefore, the positive and negative numerals printed on the paper will be apparently visually distinguishable from each other so as to achieve a reliably reminding effect. The printed paper is released from the paper exit 52 of the main body 5.

It should be noted that the above description and accompanying drawings are only used to illustrate some embodiments of the present invention, not intended to limit the scope thereof. Any modification of the embodiments should fall within the scope of the present invention.

What is claimed is:

1. A printing head for a calculator comprising:

a belt type printing head with at least a first group of numbers and a second group of numbers disposed on an outer periphery of said printing head, a belt driving means including a transmission means, an ink dipping roller, a printing head seat that serves as a base of the printing head, and a pressing head slidably mounted within said printing seat; wherein said belt driving means moves said belt type printing head past said ink dipping roller to cover said numbers with ink, said driving means thereafter positioning said belt type printing head so that a desired number is in position to be printed on paper of said calculator, said pressing head thereafter pressing said desired number against said paper to print said desired number, said second group of numbers being thicker than said first group of numbers so that when one of said second group of numbers is printed, it is readily distinguishable from said first group of number by the boldness of the print, said second group of numbers thereby accomplishing a bold print in a single printing operation.

2. The printing head of claim 1 wherein:

said second group of numbers comprises a different font from said first group of numbers.

* * * * *